US012438264B2

(12) United States Patent
Wang et al.

(10) Patent No.: US 12,438,264 B2
(45) Date of Patent: Oct. 7, 2025

(54) MOUNTING DEVICE FOR BASE STATION ANTENNA AND BASE STATION ANTENNA SYSTEM

(71) Applicant: Outdoor Wireless Networks LLC, Claremont, NC (US)

(72) Inventors: Zhigang Wang, Jiangsu (CN); Puliang Tang, Jiangsu (CN); Maosheng Liu, Jiangsu (CN); Nengbin Liu, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 178 days.

(21) Appl. No.: 18/304,825

(22) Filed: Apr. 21, 2023

(65) Prior Publication Data

US 2023/0361459 A1 Nov. 9, 2023

(30) Foreign Application Priority Data

May 6, 2022 (CN) ......................... 202221062488.7

(51) Int. Cl.

| | |
|---|---|
| ***H01Q 1/42*** | (2006.01) |
| ***H01Q 1/12*** | (2006.01) |
| ***H01Q 1/24*** | (2006.01) |
| ***H01Q 3/02*** | (2006.01) |

(52) U.S. Cl.
CPC ........... *H01Q 1/428* (2013.01); *H01Q 1/1228* (2013.01); *H01Q 1/246* (2013.01); *H01Q 3/02* (2013.01)

(58) Field of Classification Search
CPC .... H01Q 1/1228; H01Q 1/1242; H01Q 1/125; H01Q 1/246; H01Q 1/428; H01Q 3/02; F16H 1/16
See application file for complete search history.

(56) References Cited

U.S. PATENT DOCUMENTS

2016/0268669 A1* 9/2016 Wilcox .................. F16M 11/18
2021/0075083 A1* 3/2021 Udagave .............. F16M 13/022
2021/0265725 A1* 8/2021 Clifford .................... H01Q 3/32
2021/0367320 A1* 11/2021 Wang ................... H01Q 1/1264
(Continued)

FOREIGN PATENT DOCUMENTS

CN 104901013 A * 9/2015
CN 206059663 U * 3/2017
(Continued)

*Primary Examiner* — Hai V Tran
(74) *Attorney, Agent, or Firm* — Myers Bigel, P.A.

(57) ABSTRACT

The present application relates to a mounting device for a base station antenna. The mounting device is configured to mount a base station antenna to a holding pole, the mounting device includes an adjustable movable component, and a status of the movable component is related to a mechanical tilt of the base station antenna. The mounting device further includes a self-locking worm drive and a spiral gear engaged with the self-locking worm, and the spiral gear coupled with the movable component, where, by actuating the self-locking worm, the spiral gear is capable of being rotated, and thus the status of the movable component is capable of being adjusted. The present application also relates to a base station antenna system that includes a base station antenna, a lower mounting device, and an upper mounting device, and the upper mounting device is a mounting device for a base station antenna as described.

15 Claims, 3 Drawing Sheets

(56) References Cited

U.S. PATENT DOCUMENTS

2022/0328949 A1* 10/2022 Han .................... H01Q 1/1242
2022/0384946 A1* 12/2022 Kim .................... H01Q 1/1264

FOREIGN PATENT DOCUMENTS

CN 108336476 A * 7/2018
CN 112117543 A * 12/2020 ............... H01Q 1/12
GB 2505066 A * 2/2014 ............... F16H 1/16

* cited by examiner

MOUNTING DEVICE FOR BASE STATION ANTENNA AND BASE STATION ANTENNA SYSTEM

RELATED APPLICATION

The present application claims priority from and the benefit of Chinese Utility Model Application No. 202221062488.7, filed May 6, 2022, the disclosure of which is hereby incorporated herein by reference in full.

FIELD OF THE INVENTION

The present application relates to a mounting device for a base station antenna, and a base station antenna system including a base station antenna and a mounting device.

BACKGROUND OF THE INVENTION

In a wireless communication system, the transmission and reception of signals can be achieved by base station antennas. The base station antenna can be mounted on a holding pole via a mounting device. For example, the holding pole may be a tower pole of a communication tower, or a rod or analog made of a reinforced concrete.

Typically, to mount the base station antenna, an upper mounting device and a lower mounting device may be used, where the lower mounting device can provide a pivot point for the base station antenna, and the upper mounting assembly can have an adjustable effective length, so that a mechanical tilt of the base station antenna can be adjusted by adjusting this effective length. Typically, the effective length of the upper mounting device can be discretely adjusted, and thus the base station antenna can have a limited number of selectable mechanical tilts. For example, these available mechanical tilts may be in integer values of degrees. When the base station antenna has a large weight, an intermediate mounting device may be additionally provided between the upper mounting device and the lower mounting device, which also connects the base station antenna to the holding pole.

SUMMARY OF THE INVENTION

The present application aims to provide a mounting device for a base station antenna and a base station antenna system including such mounting device, where continuous adjustment of the mechanical tilt of the base station antenna can be simply realized by the mounting device.

A first aspect of the present invention relates to a mounting device for a base station antenna. The mounting device is configured to mount a base station antenna to a holding pole, the mounting device includes an adjustable movable component, and a status of the movable component is related to a mechanical tilt of the base station antenna. The mounting device further includes a self-locking worm drive and a spiral gear engaged with the self-locking worm, and the spiral gear coupled with the movable component, where, by actuating the self-locking worm, the spiral gear is capable of being rotated, and thus the status of the movable component is capable of being adjusted.

The mechanical tilt of the base station antenna can be continuously adjusted by the mounting device according to the present utility model. In addition, during the adjustment of the mechanical tilt, due to the self-locking nature of the self-locking worm, the self-locking worm drive can actuate the spiral gear, and the spiral gear cannot actuate the self-locking worm, so it can reliably prevent uncontrolled tipping of the base station antenna caused by its own gravity.

In some embodiments, the status of the movable component may involve a position and/or an angle of the movable component.

In some embodiments, the spiral gear may be a worm gear or a helical gear.

In some embodiments, the spiral gear may be a sector gear.

In some embodiments, the movable component may be an arm that is rotatably supported around a pivot axis, the spiral gear is coupled with the arm, and a corner of the arm around the pivot axis is related to the mechanical tilt of the base station antenna.

In some embodiments, the movable component may be a translatable rod, the spiral gear is coupled with the rod by a gear rack mechanism, and the position of the rod is related to the mechanical tilt of the base station antenna. Here, rotational movement of the spiral gear may be converted into translational movement of the rod.

In some embodiments, the rod may be a push rod, where the push rod acts with a chute provided to the base station antenna on one end thereof, and a rack is provided or constituted on the other end thereof. When the rack is driven by the spiral gear via the gear of the gear rack mechanism, the push rod is able to push or pull the base station antenna.

In some embodiments, the mounting device may include a first arm and a second arm, the first arm is configured to be connected to the holding pole, and the second arm is configured to be connected to the base station antenna, where the first arm is capable of rotating about a first pivot, the first arm and the second arm are capable of rotating relative to each other about a second pivot, the second arm is capable of rotating about a third pivot, and a distance between the first pivot and the third pivot is related to the mechanical tilt of the base station antenna.

In some embodiments, the movable component may be the first arm, the self-locking worm drive is mounted to a support member, and the support member is configured to be fixed on the holding pole.

In some embodiments, the movable component may be the second arm, the self-locking worm drive is mounted to the first arm, and the spiral gear is capable of rotating about the second pivot.

In some embodiments, the movable component may be the second arm, the self-locking worm drive is mounted to a connection attachment fixed with a back side of the base station antenna, and the spiral gear is capable of rotating about the third pivot.

In some embodiments, the mounting device may include a clamping device configured to be fastened to the holding pole.

In some embodiments, the support member may be a component of the clamping device, or the support member may be a separate member and be fixedly connected to the clamping device.

In some embodiments, the clamping device may include a pair of clamping members and a pair of bolt devices, when the clamping device is fastened to the holding pole, the pair of clamping members are opposite to each other with respect to an axis of the holding pole, the pair of bolt devices are opposite to each other with respect to the axis of the holding pole, each bolt device is connected to the pair of clamping members, the support member is integrally formed with one of the clamping members, or the support member is a separate member and is fixedly connected to one of the clamping members.

In some embodiments, the clamping device may be a holding ferrule that can be fastened to the holding pole, and the holding ferrule can surround the holding pole on the entire circumference of the holding pole.

In some embodiments, the support member may be a separate member and be fastened to one of the clamping members by the pair of bolt devices.

In some embodiments, the support member may be welded to one of the clamping members.

In some embodiments, the support member may have a first base and two first legs bent from the first base, the first arm has two side edges, and each side edge is rotatably connected to a corresponding first leg of the support member about the first pivot.

In some embodiments, each first leg of the support member may be equipped with a self-locking worm, and each side edge of the first arm may be equipped with a spiral gear.

In some embodiments, the support member may have a third leg disposed in the middle position between the two first legs, the only self-locking worm drive is mounted on the third leg, and the only spiral gear is mounted to the first arm in the middle position between the two side edges of the first arm.

In some implementations, each first leg may have a second base and two second legs bent from the second base, and a corresponding self-locking worm drive and an extension direction of the first leg pass through the two second legs transversely.

In some embodiments, the spiral gear may be integrally formed with one corresponding side edge of the first arm in a form of a sector gear.

In some embodiments, an extension plane of the sector gear may be parallel to an extension direction of a corresponding first leg.

In some embodiments, the mounting device may include a connection attachment, the connection attachment is configured to be fixedly mounted to a back side of the base station antenna, and the second arm and the connection attachment are rotatably connected about the third pivot.

In some embodiments, the first arm may have first holes evenly distributed around the second pivot, the second arm may have second holes evenly distributed around the second pivot, the number and angular spacing of the first holes are different from the number and angular spacing of the second holes, and the mounting device may further include a plug, which is configured to be inserted into one of the first holes and one of the second holes that have the maximum degree of overlap. In some embodiments, the plug may be a bolt, a latch, or the like.

In some embodiments, the first arm and/or the second arm and/or the support member may be constructed of a metallic material, such as stainless steel or aluminum.

A second aspect of the present invention relates to a base station antenna system, including a base station antenna, a lower mounting device and an upper mounting device, the lower mounting device and the upper mounting device being configured to mount the base station antenna to a holding pole, and the lower mounting device providing a pivot point of the base station antenna relative to the holding pole, where the upper mounting device is the mounting device for a base station antenna according to any embodiment of the present utility model.

In some embodiments, the base station antenna may be a cylindrical body having a roughly rectangular cross-section.

In some embodiments, the base station antenna may be a cylindrical body having an elliptical or circular cross-section.

The above-mentioned technical features, the technical features to be mentioned below and the technical features shown separately in the drawings may be arbitrarily combined with each other as long as the combined technical features are not contradictory. All feasible feature combinations are technical contents clearly recorded herein. Any one of a plurality of sub-features contained in the same sentence may be applied independently without necessarily being applied together with other sub-features.

BRIEF DESCRIPTION OF THE FIGURES

The present disclosure will be explained in more detail by means of exemplary embodiments with reference to the attached drawings. Among them.

DETAILED DESCRIPTION OF SPECIFIC EMBODIMENTS

Exemplary embodiments of the present application will be described below with reference to the attached drawings. However, it should be understood that the present application may be presented in many different ways and is not limited to the specific embodiments described below. It should also be understood that the embodiments disclosed in the present disclosure may be combined in various ways so as to provide more additional embodiments. In all the attached drawings, the same reference signs may represent the same or functionally identical elements.

Figure 1:
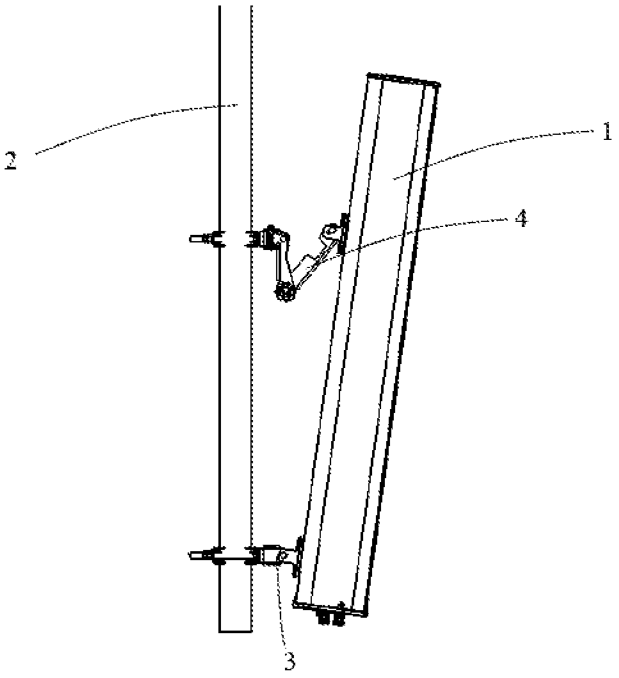
FIG. 1 is a side view of a base station antenna in its mounted state on a holding pole.
Figure 2:
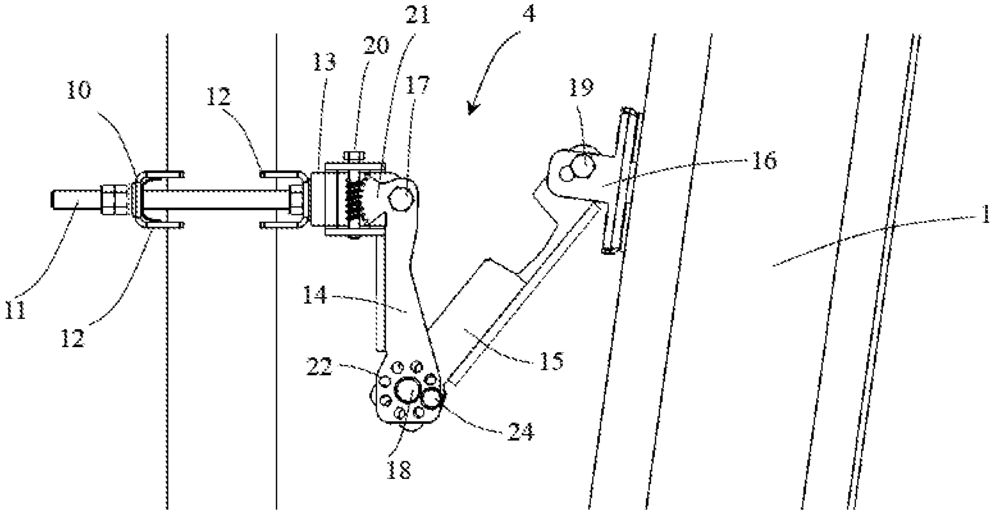
FIG. 2 is a partially enlarged view of FIG. 1.
Figure 3:
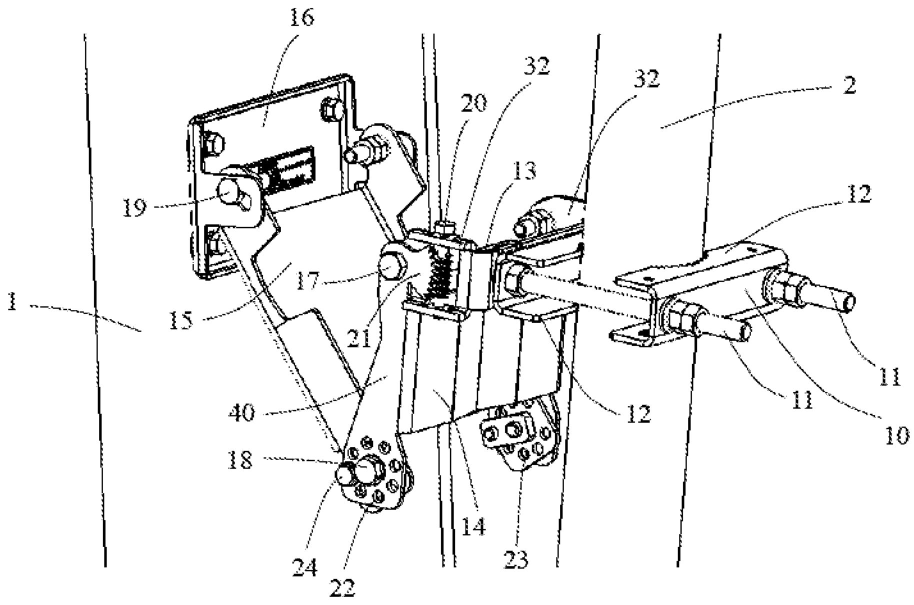
FIG. 3 is a partially enlarged perspective view of FIG. 1.
Figure 4:
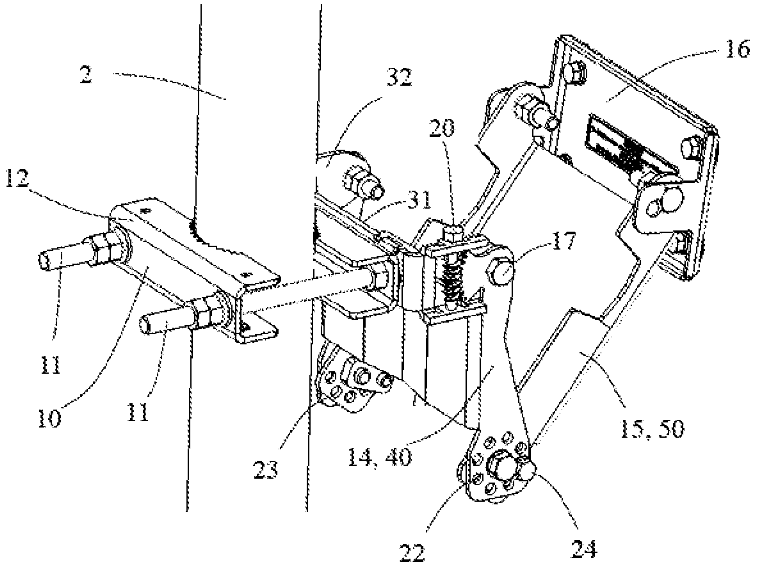
FIG. 4 is a partially enlarged perspective view from another perspective of FIG. 1.
Figure 5:
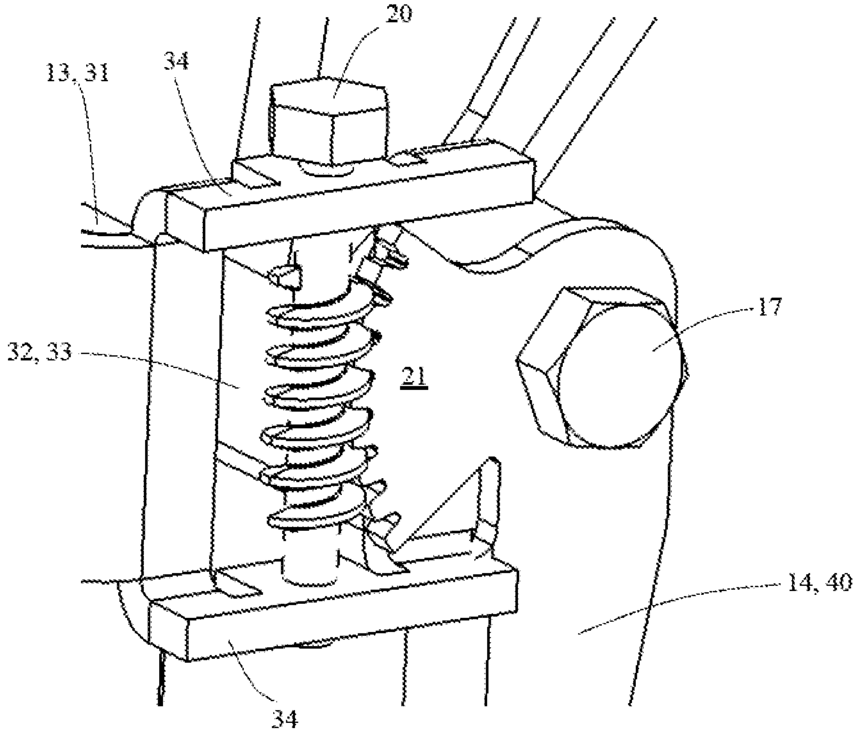
FIG. 5 is a partially enlarged perspective view of a mounting device of FIG. 1.

FIG. 1 is a side view of a base station antenna 1 in its mounted state on a holding pole 2, and FIG. 2 is a partially enlarged view of the side view of FIG. 1. FIG. 3 and FIG. 4 are partially enlarged views of FIG. 1 from two different perspectives, where, for clarity, the base station antenna 1 is hidden in FIG. 4. FIG. 5 is a partially enlarged perspective view of a mounting device 4 of FIG. 1 to more clearly describe key details of the mounting device 4.

FIG. 1 shows an exemplary base station antenna system, where a cylindrical base station antenna 1 with a roughly rectangular cross-section is mounted through an upper mounting device 4 and a lower mounting device 3 to a holding pole 2 extending in a vertical direction. The lower mounting device 3 provides a pivot point of the base station antenna 1 relative to the holding pole 2. The upper mounting device 4 has an adjustable effective connection length, and thus can adjust a mechanical tilt of the base station antenna 1. Typically, in known prior art, the mechanical tilt of the base station antenna is discretely adjustable, for example at an interval of 1°. In the embodiment shown, the possibility of continuous adjustment of the mechanical tilt of the base station antenna 1 is provided.

The mounting device 4 may include a first arm 14 and a second arm 15. The first arm 14 is configured to be connected to the holding pole 2, and the second arm 15 is configured to be connected to the base station antenna 1. The first arm 14 is capable of rotating about a first pivot 17, the first arm 14 and the second arm 15 are capable of rotating relative to each other about a second pivot 18, and the second arm 15 is capable of rotating about a third pivot 19. A distance between the first pivot 17 and the third pivot 19 can constitute an adjustable effective connection length between the base station antenna 1 and the holding pole 2, which is related to the mechanical tilt of the base station antenna 1.

The mounting device 4 may further include a clamping device 10, which is configured to be fastened to the holding pole 2. The clamping device 10 includes a pair of clamping members 12 and a pair of bolt devices 11. When the clamping device 10 is fastened on the holding pole 2, the pair of clamping members 12 are opposite to each other about an axis of the holding pole 2, the pair of bolt devices 11 are opposite to each other about the axis of the holding pole 2, and each bolt device 11 connects the pair of clamping members 12. Each clamping member 12 may have a circularly curved recess in a part of area therein, and the shape of the recess may be substantially complementary to the cross-sectional shape of the holding pole 2, so that the clamping member 12 and the holding pole 2 are in contact at a predetermined circumferential angle of the holding pole 2. In addition, the recess may be provided with teeth, so that the clamping member 12 may be more reliably fixed on the holding pole 2 by means of these teeth.

The mounting device 4 may further include a support member 13, which may be fixedly connected to one of the clamping members 12. In some exemplary embodiments, the support member 13 and the clamping member 12 may be integrally formed or welded to each other. In some exemplary replacement embodiments, the support member 13 may be a separate member and fastened to one clamping member 12 by the pair of bolt devices 11. The first arm 14 may be rotatably connected to the support member 13 about the first pivot 17, and thereby be rotatably connected to the clamping device 10 and ultimately rotatably connected to the holding pole 2.

The support member 13 may have a first base 31 and two first legs 32 bent from the first base 31. The support member 13 may be abutted against the flat base of the matching clamping member 12 with its first base 31, and fastened and connected by bolt rods of the two bolt devices 11 and matching nuts. The first arm 14 may have two side edges 40 bent from the base of the first arm 14, each side edge 40 being rotatably connected to a corresponding first leg 32 of the support member 13 about the first pivot 17. Here, the first pivot 17 is achieved by two short bolts, each of which rotatably connects one first leg 32 with one side edge 40. In an embodiment not shown, instead of two short bolts, one long bolt may be used, or two rivets may be used.

The second arm 15 may be constructed similarly to the first arm 14 and thus also have one base and two side edges 50. Each side edge 40 of the first arm 14 may be rotatably connected to a matching side edge 50 of the second arm 15 about the second pivot 18. The second pivot 18 may be implemented in the same or similar manner as the first pivot 17.

The mounting device 4 may also include a connection attachment 16, which is configured to be fixedly mounted to a back side of the base station antenna 1. The second arm 15 is rotatably connected to the connecting attachment 16 about the third pivot 19. The third pivot 19 may be implemented in the same or similar manner as the first pivot 17 and/or the second pivot.

The two first legs 32 of the support member 13 may each have a second base 33 and two second legs 34 bent outwardly from the second base 33, each of the two second legs 34 may have an aperture, and the self-locking worm drive 20 and an extension direction of the first leg 32 may pass transversely the two second legs 34 through the apertures in the two second legs 34. The self-locking worm drive 20 may have an actuating head, such as a hexagonal head, and thus the actuating head may be engaged with a wrench to perform rotational actuation of the self-locking worm drive 20.

The two side edges 40 of the first arm 14 may be respectively equipped with a spiral gear 21, which may be integrally formed with a corresponding side edge 40 in a form of a sector gear, and thus may also be rotated together with the first arm 14 about the first pivot 17. An extension plane of the spiral gear 21 may be parallel to an extension direction of a corresponding first leg 32 of the support member 13. The spiral gear 21 may be a worm gear. Alternatively, the spiral gear 21 may also be a helical gear so that manufacturing costs may be further reduced. In an embodiment not shown, the spiral gear 21 may be configured as a separate gear and directly fixedly connected to the first arm 14, or coupled therewith via a transmission mechanism.

By actuating the self-locking worm drive 20, the spiral gear 21 can be rotated so that a corner of the first arm 14 about the first pivot 17 can be adjusted. By adjusting the corner of the first arm 14, an included angle of the first arm 14 and the second arm 15 changes, a distance between the first pivot 17 and the third pivot 19 changes, and the mechanical tilt of the final base station antenna 1 can be adjusted. Instead, the spiral gear 21 cannot actuate the self-locking worm drive 20 due to the self-locking nature of the self-locking worm drive 20. Therefore, during the adjustment of the mechanical tilt of the base station antenna 1, there is no need to worry that the base station antenna 1 inadvertently tilts under the gravity of the base station antenna around its pivot point in the lower mounting device 3.

The first arm 14 may have first holes 22 evenly distributed about the second pivot 18 on each side edge 40 thereof. The second arm 15 may have second holes 23 evenly distributed about the second pivot 18 on each side edge thereof. The number and angular spacing of the first holes 22 are different from the number and angular spacing of the second holes 23. Through the arrangement of a group of first holes 22 and a group of second holes 23, in the case of any desired mechanical tilt of the base station antenna 1, when the first arm 14 and the second arm 15 have a corresponding included angle, always one of the first holes 22 and one of the second holes 23 have the maximum degree of overlap on each side edge 40 of the first arm 14 and a matching side edge of the second arm 15. In the pair of holes composed of the one first hole 22 and the one second hole 23, a plug 24, such as a bolt, may be inserted in order to advantageously maintain the adjusted mechanical tilt of the base station antenna 1 and improve the load carrying performance of the mounting device 4. Since the pair of holes at the maximum degree of overlap do not necessarily coincide completely, multiple plugs of different diameters can be provided from which a suitable plug can be selected for insertion into the pair of holes.

In the embodiment shown, the self-locking worm drive 20 is equipped with a stationary support member 13, and the spiral gear 21 is equipped with the first arm 14. In some embodiments not shown, the self-locking worm drive 20 may be equipped with the first arm 14, and the spiral gear 21 may be equipped with the second arm 15. The spiral gear 21 may rotate about the second pivot 18 and be coupled with the second arm 15, for example, integrally formed with the second arm 15. In some embodiments not shown, the self-locking worm drive 20 may be equipped with the connection attachment 16, and the spiral gear 21 may be equipped with the second arm 15. The spiral gear 21 may rotate about the third pivot 19 and be coupled with the second arm 15, for example, integrally formed with the second arm 15.

It should be noted that the terminology used here is only for the purpose of describing specific aspects, and not for limiting the disclosure. The singular forms "a" and "the one" as used herein shall include plural forms, unless the context explicitly states otherwise. It can be understood that the terms "including" and "inclusive" and other similar terms, when used in the application documents, specify the existence of the stated operations, elements and/or components, and do not exclude the existence or addition of one or more other operations, elements, components and/or combinations thereof. The term "and/or" as used herein includes all of any combinations of one or more relevant listed items. In the description of the attached drawings, similar reference numerals always indicate similar elements.

The thickness of the elements in the attached drawings may be exaggerated for clarity. In addition, it can be understood that if an element is referred to as being on, coupled to, or connected to, another element, then the said element may be directly formed on, coupled to, or connected to the other element, or there can be one or more intervening elements between them. Conversely, if the expressions "directly on", "directly coupled to" and "directly connected to" are used herein, it means that there are no intervening elements. Other words used to describe the relationship between elements should be interpreted similarly, such as "between" and "directly between", "attached" and "directly attached", "adjacent" and "directly adjacent" and so on.

Terms such as "top", "bottom", "upper", "lower", "above", "below", etc. herein are used to describe the relationship of one element, layer or region with respect to another element, layer or region as shown in the attached drawings. It can be understood that in addition to the orientations described in the attached drawings, these terms should also include other orientations of the device.

It can be understood that although the terms "first", "second", etc. may be used herein to describe different elements, these elements should not be limited by these terms. These terms are only used to distinguish one element from another. Therefore, the first element can be referred to as the second element without departing from the teachings of the concept of the present disclosure.

It may also be considered that all the exemplary embodiments disclosed herein may be arbitrarily combined with each other.

Finally, it should be pointed out that the aforementioned embodiments are only used to understand the present disclosure, and do not limit the protection scope of the present disclosure. For those of ordinary skill in the art, modifications can be made on the basis of the aforementioned embodiments, and these modifications do not depart from the protection scope of the present disclosure.

The invention claimed is:

1. A mounting device for a base station antenna, the mounting device comprising:

a clamping device comprising a pair of clamping members configured to mount the base station antenna to a mounting pole;

an adjustable movable component having a first arm and a second arm pivotably coupled to the first arm, wherein a position of the adjustable movable component is related to a mechanical tilt of the base station antenna relative to the mounting pole;

a support member, the support member having a base coupled to one of the clamping members and a pair of legs extending outwardly from opposing ends of the base, at least one of the legs having opposing flanged edges;

a self-locking worm drive extending between the opposing flanged edges of the support member; and a spiral gear integrally formed with an edge of the first arm of the adjustable movable component and engaged with the self-locking worm drive, wherein, by actuating the self-locking worm drive, the spiral gear is configured to move relative to the self-locking worm drive to adjust the position of the adjustable movable component, and thereby adjust the mechanical tilt of the base station.

2. The mounting device for a base station antenna according to claim 1, wherein the spiral gear is a worm gear.

3. The mounting device for a base station antenna according to claim 1, wherein the spiral gear is a helical gear.

4. The mounting device for a base station antenna according to claim 1, wherein the spiral gear is a sector gear.

5. The mounting device for a base station antenna according to claim 1, wherein the first arm of the adjustable movable component is rotatably supported around a pivot axis, and a corner of the first arm around the pivot axis is related to the mechanical tilt of the base station antenna.

6. The mounting device for a base station antenna according to claim 1, wherein the first arm is configured to be connected to the clamping device, and the second arm is configured to be connected to the base station antenna, wherein the first arm is capable of rotating about a first pivot, the first arm and the second arm are capable of rotating relative to each other about a second pivot, the second arm is capable of rotating about a third pivot, and a distance between the first pivot and the third pivot is related to the mechanical tilt of the base station antenna.

7. The mounting device for a base station antenna according to claim 6, wherein the mounting device further comprises a connection attachment, the connection attachment is configured to be fixedly mounted to a back side of the base station antenna, and the second arm and the connection attachment are rotatably connected about the third pivot.

8. The mounting device for a base station antenna according to claim 6, wherein the first arm has first holes evenly distributed around the second pivot, the second arm has second holes evenly distributed around the second pivot, the number and angular spacing of the first holes are different from the number and angular spacing of the second holes, and the mounting device further comprises a plug, which is configured to be inserted into a hole pair of one of the first holes and one of the second holes that have the maximum degree of overlap.

9. The mounting device for a base station antenna according to claim 1, wherein the support member is a component of the clamping device, or the support member is a separate member and is fixedly connected to the clamping device.

10. The mounting device for a base station antenna according to claim 9, wherein the clamping device further comprises a pair of bolt devices, wherein when the clamping device is fastened to the mounting pole, the pair of clamping members are opposite to each other with respect to an axis of the mounting pole, the pair of bolt devices are opposite to each other with respect to the axis of the mounting pole, each bolt device is connected to the pair of clamping members, the support member is integrally formed with one of the clamping members, or the support member is a separate member and is fixedly connected to one of the clamping members.

11. The mounting device for a base station antenna according to claim 10, wherein the support member is a separate member and is fastened to one of the clamping members by the pair of bolt devices.

12. The mounting device for a base station antenna according to claim 1, wherein the first arm has two side edges, each side edge is rotatably connected to a corresponding leg of the support member about the first pivot.

13. The mounting device for a base station antenna according to claim 12, wherein the spiral gear is integrally formed with a corresponding side edge of the first arm in a form of a sector gear, and an extension plane of the sector gear is parallel to an extension direction of a corresponding leg.

14. A base station antenna system comprising a base station antenna, a lower mounting device and an upper mounting device, the lower mounting device and the upper mounting device being configured to mount the base station antenna to a mounting pole, and the lower mounting device providing a pivot point of the base station antenna relative to the mounting pole, wherein the upper mounting device is the mounting device for a base station antenna according to claim 1.

15. A mounting device adapted for mounting a base station antenna to a mounting structure, the mounting device comprising:

a clamping device configured to be fastened to the mounting structure;

an adjustable movable component comprising a first arm and a second arm, the first arm connected to the clamping device via a support member, and the second arm configured to be connected to the base station antenna;

a self-locking worm drive coupled to the support member and the adjustable movable component; and a gear integrally formed with an edge of the first arm of the adjustable movable component and engaged with the self-locking worm drive, wherein the first arm of the adjustable movable component is configured to rotate about a first pivot, the first and second arms of the adjustable movable component are configured to rotate relative to each other about a second pivot, the second arm of the adjustable movable component is configured to rotate about a third pivot, and a distance between the first pivot and the third pivot is related to a mechanical tilt of the base station antenna, wherein the first arm has first holes evenly distributed around the second pivot, the second arm has second holes evenly distributed around the second pivot, and a hole pair of one of the first holes and one of the second holes is configured to receive a plug to maintain the mechanical tilt, and wherein, by actuating the self-locking worm drive, the spiral gear is configured to move relative to the self-locking worm drive to rotate the first arm about the first pivot, thereby adjusting the distance between the first pivot and the third pivot, and thus, the mechanical tilt of the base station antenna.

* * * * *